United States Patent [19]

Masutani

[11] 4,240,023
[45] Dec. 16, 1980

[54] DEVICE FOR INDICATING THE RATE OF CHARGE IN AN AC GENERATOR

[75] Inventor: Takayoshi Masutani, Toyota, Japan

[73] Assignee: Toyota Jidosha Kogyo Kabushiki Kaisha, Toyota, Japan

[21] Appl. No.: 974,437

[22] Filed: Dec. 29, 1978

[30] Foreign Application Priority Data

Feb. 20, 1978 [JP] Japan ................................. 53-18760
Feb. 20, 1978 [JP] Japan ............................. 53-21054[U]

[51] Int. Cl.³ ............................................... H02J 9/14
[52] U.S. Cl. ........................................ 322/99; 320/48
[58] Field of Search ...................... 322/28, 99; 320/48, 320/43

[56] References Cited

U.S. PATENT DOCUMENTS

| 3,022,456 | 2/1962 | Larson et al. | 322/99 UX |
| 3,336,519 | 8/1967 | Grimm | 322/99 X |
| 3,469,167 | 9/1969 | Wright | 322/99 X |
| 3,764,879 | 10/1973 | Hill | 322/99 X |
| 4,121,146 | 10/1978 | Hill | 320/48 |

Primary Examiner—Robert J. Hickey
Attorney, Agent, or Firm—Koda and Androlia

[57] ABSTRACT

A device for indicating the rate of charge in an AC generator with a contactless type voltage regulator having an exciting diode for supplying electric current to a field coil of the AC generator. The device includes a relay coil connected to an output end of the exciting diode, a relay contact responsive to an excitation of the relay coil and a charge warning means responsive to the relay contact thereby preventing malfunction of the charge warning means.

5 Claims, 3 Drawing Figures

4,240,023

DEVICE FOR INDICATING THE RATE OF CHARGE IN AN AC GENERATOR

BACKGROUND OF THE INVENTION

1. Field of the Invention

The present invention relates to charge warning devices and more particularly to charge warning devices for an AC generator with a contactless type voltage regulator.

2. Prior Art

In the prior art, AC generator for use in motor vehicles have included contact-type regulators which mechanically interrupt the field current of an AC generator by means of a contact thereby making the generated voltage be constant. However, recently, there has been a tendency to provide the AC generator with a contactless type regulator in which the field current is interrupted by a semiconductor consisting mainly of a hybrid IC. This type of AC generator with the contactless type regulator, having no mechanical contacts, has many desirable characteristics such as a higher reliability and a long service life.

Shown in FIG. 1 is one example of a prior art circuit for an AC generator having a contactless type regulator. The AC generator 10 includes three-phase wired stator coil 12, rectifiers 14, a field coil 16 and exciting diodes 18 for supplying current to the field coil 16. Incorporated therein is an IC regulator 20 consisting of a semiconductor circuit using a hybrid IC. A charge warning lamp 22 is provided with one terminal being connected to regulator terminal L of alternator 10. An ignition switch 24 is connected to the other terminal of the charge waring lamp 22 via a fuse 30. A battery is connected to battery terminal B of the AC generator 10 and connected to the other terminal of the ignition switch 24 via a fuse 28.

In such a prior art device for indicating the rate of charge in the AC generator, when the ignition switch 24 is off, the charge warning lamp 22 does not light. When the ignition switch 24 is turned on and the engine is in a static condition, the electric potential of the AC generator at point A becomes substantially 0 volts and current supplied from the battery 26 passess through the ignition switch 24, the charge warning lamp 22, the regulator terminal L, field coil 16 and IC regulator 20. As a result, the charge warning lamp 22 lights up. When the engine is started, the AC generator 10 starts to generate electricity and voltage is generated at the point A whereby the opposite ends of the charge warning lamp 22 have substantially the same electrical potential and therefore, the charge warning lamp 22 is out. The charge warning lamp 22 can be checked by turning the ignition switch on and leaving the engine off. If the ignition switch is on and the engine is running and the charge warning lamp 22 is on, electricity is not being generated due to a failure of the AC generator 10. However, with the prior art devices for indicating the rate of charge there has been a certain disadvantage that when the difference in electrical potential between the opposite ends of the charge warning lamp 22 becomes larger than a small amount, even if the AC generator 10 is operating normally, the charge warning lamp 22 turns on to a slight extent whereby the operator may feel uneasy about the function of the AC generator 10.

SUMMARY OF THE INVENTION

Accordingly, it is a general object of the present invention to obviate the disadvantages of the prior art devices described above.

It is another object of the present invention to provide a device for indicating the rate of charge in an AC generator which does not give ambiguous indications of the rate of charge.

It is yet another object of the present invention to provide a device for indicating the rate of charge capable of supplying a ground to various electrical components when the ignition switch is on.

It is further object of the present invention to provide a device for indicating the rate of charge in an AC generator capable of supplying a ground to various electrical components even when the ignition switch is off.

In keeping with the principles of the present invention, the objects are accomplished by a unique device for indicating the rate of charge in an AC generator with a contactless type voltage regulator having an exciting diode for supplying electric current to a field coil of the AC generator. The device includes a relay coil connected to an output end of the exciting diode, a relay contact responsive to excitation of the relay coil and a charge warning means connected to a battery via the relay contact. In one preferred embodiment of the device for indicating the rate of charge in an AC generator, the relay contact is a normally open contact and in another embodiment the relay contact is a normally closed contact.

BRIEF DESCRIPTION OF THE DRAWINGS

The above mentioned features and objects of the present invention will become more apparent with reference to the following description taken in conjunction with the accompanying drawings wherein like reference numerals denote like elements and in which.

DETAILED DESCRIPTION OF THE INVENTION

Figure 2:
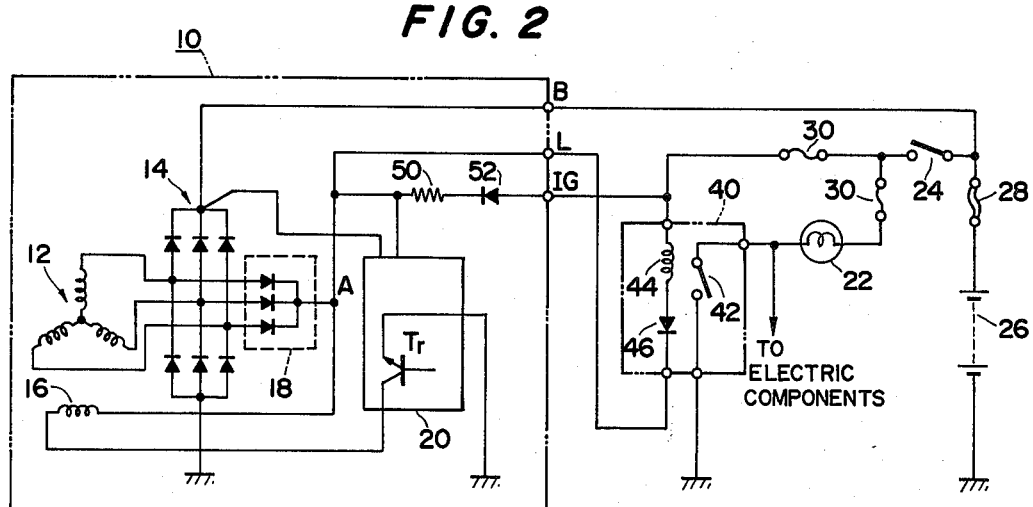
FIG. 2 is a circuit diagram showing one embodiment of a device for indicating the rate of charge in an AC generator in accordance with the teachings of the present invention.

Referring more particularly to the figures, shown in FIG. 2 is one embodiment of a device for indicating the rate of charge in accordance with the teachings of the present invention. The embodiment of FIG. 2 is similar to the prior art example except that a relay coil 44 is connected between the output end of the exciting diode 18 and the ignition switch 24, a normally open contact 42 which is responsive to an excitation of the relay coil 44 and a charge warning lamp 22 is adapted to be turned on and off by the normally open contact 42.

In the embodiment of FIG. 2, a relay 40 for indicating the rate of charge is provided and the relay 40 includes a normally open contact 42, a relay coil 44 for actuating the normally open contact 42 and a diode 46 for preventing reverse current connected in series with the relay coil 44. The diode 46 for preventing reverse current is connected at the cathode end to a regulator terminal L of AC generator 10 and the relay coil 44 is connected at one end to an ignition terminal IG of the AC generator 10 and one end of fuse 30. One end of the normally open contact 42 is directly grounded and the other end thereof is connected to one end of the charge warning lamp 22 and various electric components (e.g. a stop lamp disconnection warning, a washer level warning lamp, a battery liquid level warning lamp, and an engine oil level warning lamp, all of which are checked for operation by lighting up via the ground supplied) requiring a ground when the engine is in a static condition. In addition, a resistance 50 for initial excitation and diode 52 for preventing a reverse current is provided.

In operation, firstly when the ignition switch 24 is off, voltage is not applied to the charge warning lamp 22 and therefore the lamp is off. Next, when the ignition switch is turned on, the electric potential of the regulator terminal L of the AC generator 10 is substantially 0 volts with the engine not running. As a result, current supplied from the battery 26 passes through the ignition switch 24, the relay coil 24 and the diode for preventing reverse current of the relay 40, the field coil 16 and the IC regulator 20 of the AC generator 10. Accordingly, the relay coil 44 is excited and the normally open contact 42 of the relay 40 is closed. As a result, part of the current supplied from the battery 26 is supplied to the charge warning lamp 22 through the ignition switch 24 whereby the charge warning lamp 22 is turned on. At this time, the terminal of the charge warning lamp 22 on the side of the relay 40 is directly grounded through the normally open contact 42 of the relay 40 for indicating the rate of charge and as a result becomes a perfect ground so that the various electric components can be supplied with a ground. Furthermore, when the starter starts the engine, voltage is generated at the regulator terminal L of the AC generator 10 whereby the electrical potential at the opposite ends of the relay coil 44 becomes substantially equal to each other and the flow of current in the relay coil 44 is stopped. As a result, the normally open contact 42 of the relay 40 is open and the charge warning lamp is turned off.

It should be pointed out however, that in this embodiment, the connection to the ground for the various electric components is supplied only when the ignition switch is on.

Figure 3:
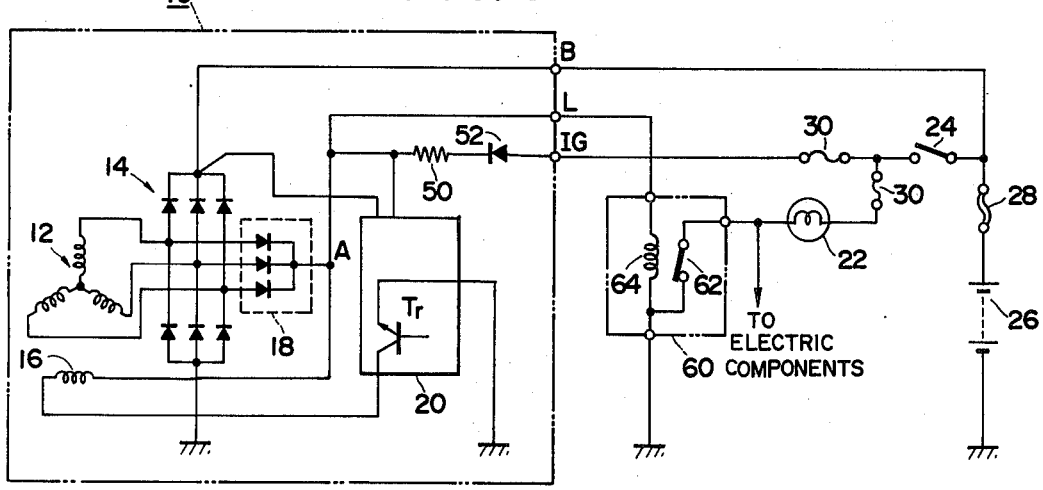
FIG. 3 is a circuit diagram illustrating a second embodiment of a device for indicating the rate of charge in an AC generator in accordance with the teachings of the present invention.

Referring more particularly to FIG. 3, shown therein is a second embodiment of a device for indicating the rate of charge in accordance with the teachings of the present invention. As shown in FIG. 3, this second embodiment differs from the first embodiment only on that a relay coil 64 is connected between the output end of the exciting diodes 18 and the ignition switch 24, a normally closed contact 62 operated by the excitation of the relay coil 64 is provided and the charge warning lamp 22 is adapted to be turned on and off by the normally closed contact 62.

Figure 1:
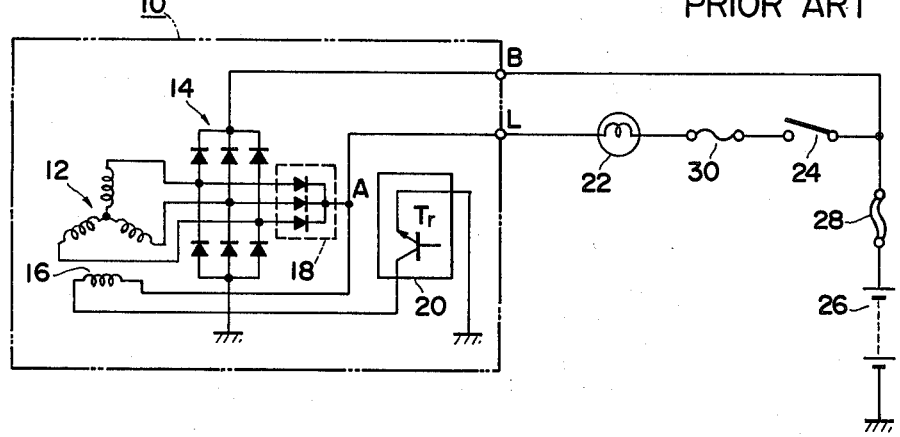
FIG. 1 is a cricuit diagram illustrating a prior art device for indicating the rate of charge in an AC generator in a contactless type regulator.

As shown in FIG. 3, a relay 60 for indicating the rate of charge is provided with a normally closed contact 62 and a relay coil 64 for exciting the contact 62. One terminal of the relay coil 64 is connected to the normally closed contact 62 and directly grounded. Additionally, the other terminal of the relay coil 64 is connected to the regulator terminal L of the AC generator 10. Furthermore, the other terminal of the normally closed contact 62 is connected to one of the terminals of the charge warning lamp 22 and is connected to the previously described various other electrical components requiring a ground when the engine is not operating. In all the ways, the present embodiment is identical to the first embodiment described in FIG. 1.

In operation, firstly, when the ignition switch 24 is off, current is not supplied to the charge warning lamp 22 whereby the charge warning lamp 22 is off. Next, when the ignition switch 24 is turned on, the current supplied from the battery 26 passes through the ignition switch 24, the charge warning lamp 22 and the normally closed contact 62 of the relay 60 and the charge warning lamp 22 is turned on. For the case where the engine is not operating, the electrical potential at the regulator terminal L of the AC generator 10 is substantially 0 volt and therefore, the electrical potentials at the opposite ends of the relay coil 64 of the relay 60 are substantially equal to each other and the normally closed contact 62 is maintained in the closed condition. At this time, the terminal of the charge warning lamp 22 on the side of the relay 60 is directly connected through the normally closed contact 62 to ground and hence a perfect earth potential is supplied to the above-described various electrical components thus providing a check for malfunction of such components. Furthermore, when the starter starts the engine, the AC generator 10 generates electricity and voltage is generated at the generator terminal L of the AC generator 10. As a result, current flows through the coil 64 of the relay 60 and the normally closed contact 62 of the relay 60 is opened and the charge warning lamp 22 is turned off.

It should be apparent that in this second embodiment, the earth potential can be supplied to the various electrical components even when the ignition switch is off.

It should be apparent that while in both of the embodiments described above the means for indicating the rate of charge was a warning lamp, other means for indicating the rate of charge could be utilized such as an acoustical alarm, mechanical flag and the like could be used. Furthermore, even though the above embodiments were described in terms of an AC generator for a motor vehicle, it should be apparent that this device is applicable to use with all AC generator having contactless regulators.

From the above, it should be apparent to one skilled in the art that the above-described embodiments are merely illustrative of but a few of the many possible specific embodiments which represent the applications of the principles of the present invention. Numerous and varied other arrangements can be readily devised by those skilled in the art without departing from the spirit and scope of the invention.

I claim:

1. A device for indicating the rate of charge in an AC generator for a vehicle comprising an exciting diode for feeding electric current to a field coil and a contactless regulator, and whose output end is connected to a battery mounted on the vehicle for charging, characterized in that:

a relay coil is provided between output end of said exciting diode and one end of an electric power switch, the other end of which is connected to said battery;

a reverse-current preventive diode is connected to said relay coil in series and in a manner that said field coil is on a cathode side of said preventive diode;

a normally open contact closing through the excitation of said relay coil is provided; and the device for indicating the rate of charge is connected to said battery through said normally open contact.

2. A device for indicating the rate of charge in an AC generator for a vehicle as set forth in claim 1, characterized in that said device for indicating the rate of charge is a lamp.

3. A device for indicating the rate of charge in an AC generator for a vehicle as set forth in claim 1, characterized in that an excitation circuit including a resistance and for feeding electric current to aid field coil when said generator is started is connected to said relay coil in parallel.

4. A device for indicating the rate of charge in an AC generator for a vehicle as set forth in claim 3, characterized in that a reverse-current preventive diode is connected to said resistance in series and in a manner that said field coil is on the side of cathode, in said excitation circuit.

5. A device for indicating the rate of charge in an AC generator for a vehicle characterized by:

(a) a three-phase wired stator coil;

(b) a field coil rotatably disposed in opposed relation to said stator coil;

(c) a rectifier connected to said stator coil for full-wave rectification thereof;

(d) an exciting diode provided in parallel with said rectifier and whose output end is connected to one end of said field coil;

(e) a regulator for detecting voltage generated in said stator coil and turning On and OFF the other end of said field coil so that said voltage can be set at a predetermined value;

(f) a battery connected to said rectifier;

(g) an ignition switch, one end of which is connected to said battery;

(h) a relay coil connected to a portion between one end of said ignition coil and the junction coil and the junction of said exciting diode with said field coil;

(i) a normally open contact closing through the excitation by said relay coil;

(j) a charge warning lamp connected to said battery through said ignition switch and said normally open contact;

(k) an initially exciting resistance connected to a portion between the junction of said exciting diode with said field coil and the junction of said ignition coil with said relay coil;

(l) a reverse-current preventive diode connected to said initially exciting resistance in series and in a manner that said field coil is on the side of cathod; and (m) a reverse-current preventive diode connected to said relay coil in series and in a manner that said filed coil is on the side of cathode.

* * * * *